United States Patent Office 3,309,108
Patented Mar. 14, 1967

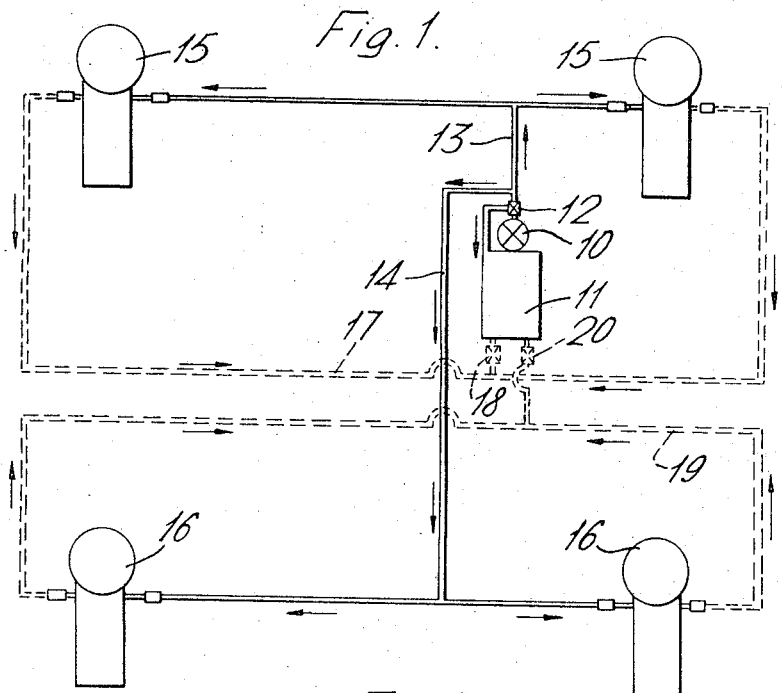
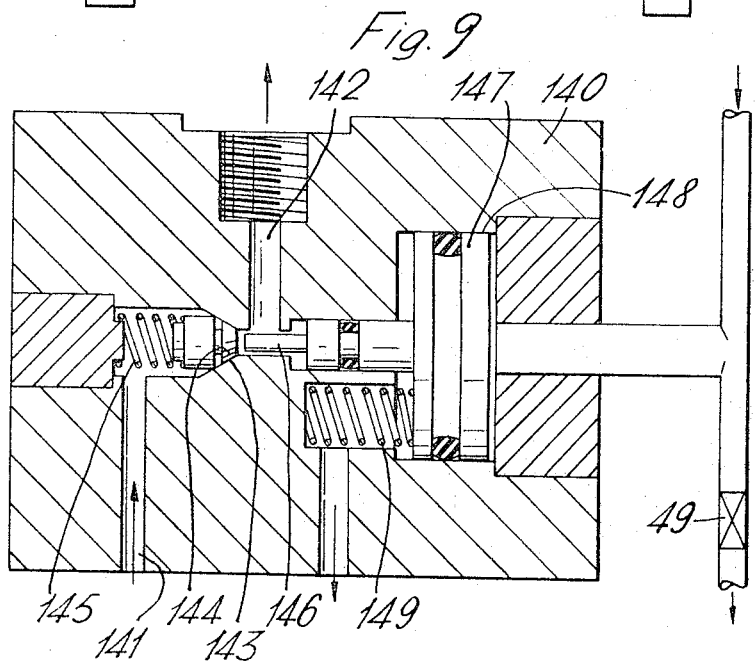

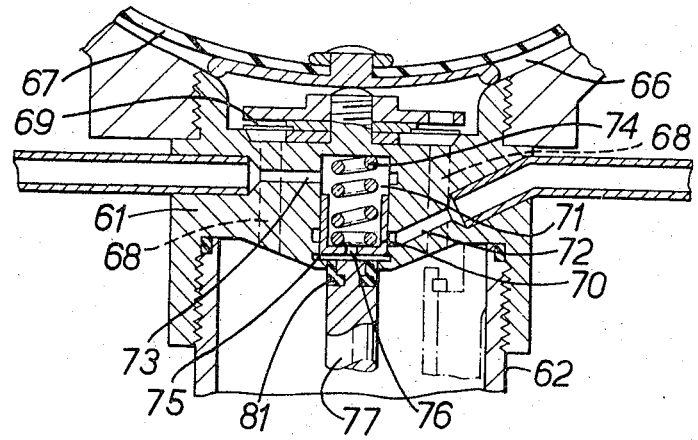
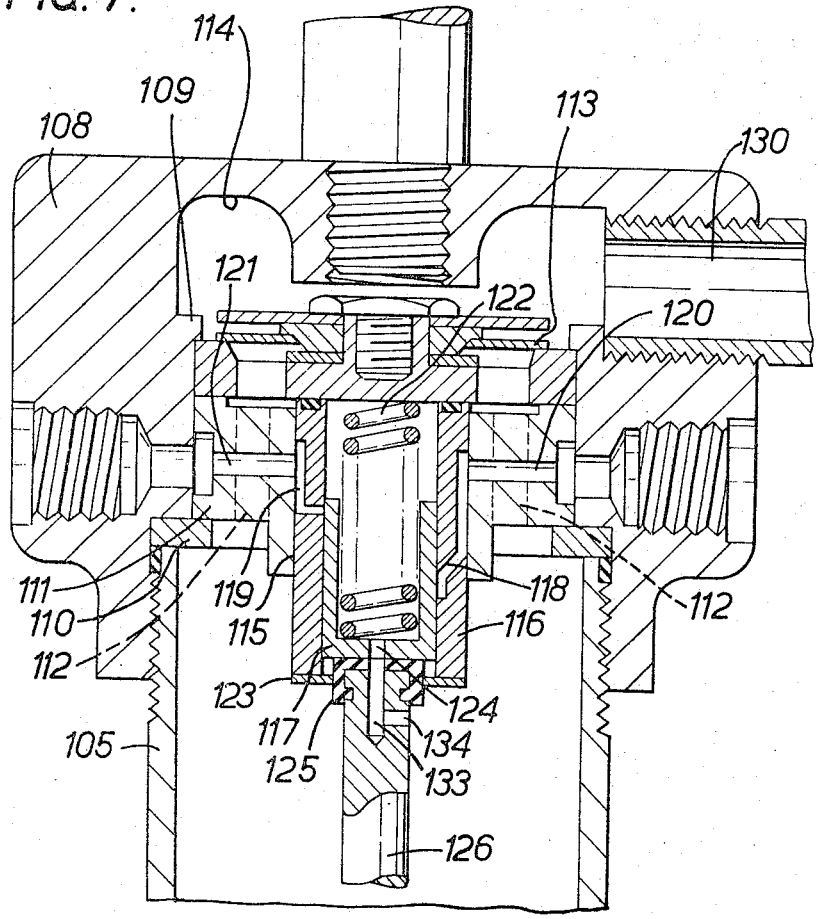

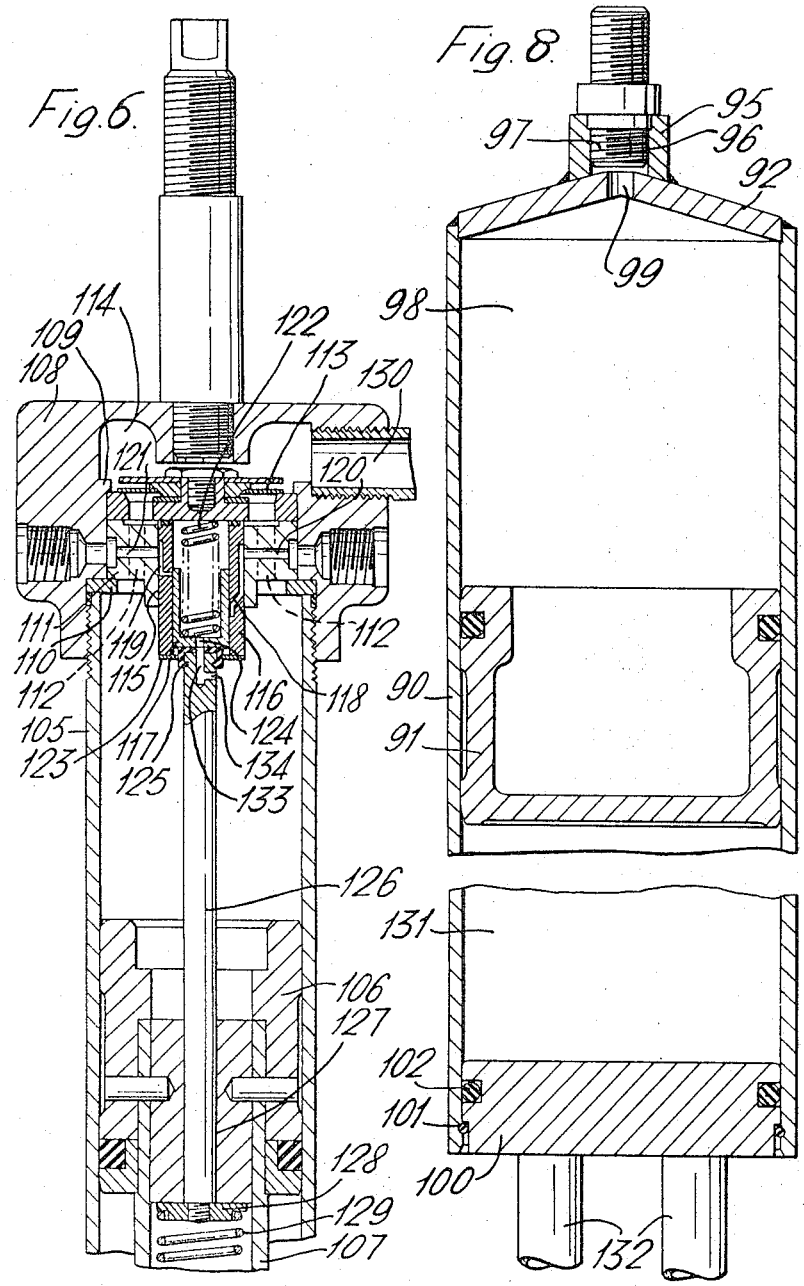

3,309,108
VEHICLE SUSPENSION SYSTEMS
Douglas Bryan Wilkins, Solihull, and Eric David Hopkins, Birmingham, England, assignors to Girling Limited, Birmingham, England, a British company
Filed July 31, 1964, Ser. No. 387,555
Claims priority, application Great Britain, July 31, 1963, 25,354/63; Mar. 3, 1964, 8,867/64
2 Claims. (Cl. 280—124)

This invention relates to vehicle suspension systems of the kind in which hydraulic fluid from a high pressure source is circulated to individual suspension struts whose effective suspension length is automatically controlled independently of the weight and loading of the vehicle. Each individual strut may be associated with one wheel or one pair of wheels of the vehicle.

It is known to provide a single valve separate from the struts for automatically controlling the quantity of hydraulic fluid being passed to and from each strut, thereby controlling the length of each strut. In such an arrangemen should one wheel of the vehicle be disposed over a drain or pot-hole so that it is not taking its full share of the weight and loading of the vehicle when at rest, the internal pressure of the strut for this wheel will be reduced and when the vehicle is driven away a considerable time will elapse before the proper levelling of the strut in consequence of the vehicle as a whole is obtained.

According to our invention in a vehicle suspension system of the kind set forth the effective length of each strut is automatically and individually maintained at a substantially constant value irrespective of the weight and loading of the vehicle by means provided within each strut.

Each strut comprises a hollow piston rod carrying a piston working in a cylinder and subjected on its upper face to fluid under pressure, a control rod slidably passing through the piston and engaging at one end with a spool valve controlling ports communicating respectively with the source of fluid under pressure supply and exhaust, the control rod engaging at the other end with resilient means housed within the piston rod.

The spool valve works in a bore or a sleeve in a closure for the high pressure end of the cylinder, and an orifice or passage formed in the valve spool allows fluid to flow from the high pressure space above the piston and to exhaust when the control rod is moved away from its engagement with the spool valve.

The end of the control rod engages with the spool valve to prevent flow of hydraulic fluid through the orifice or passage to exhaust when the spool valve is moved by the control rod and hydraulic fluid flows into the space above the piston from the source of fluid under pressure.

Figure 2:
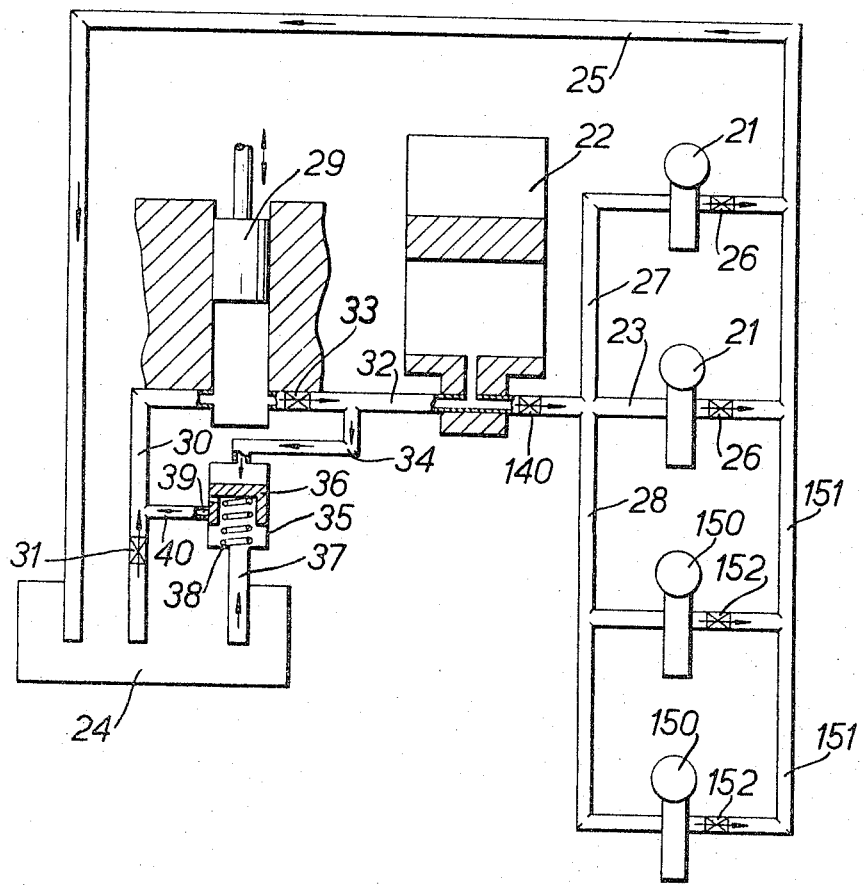
Figure 3:
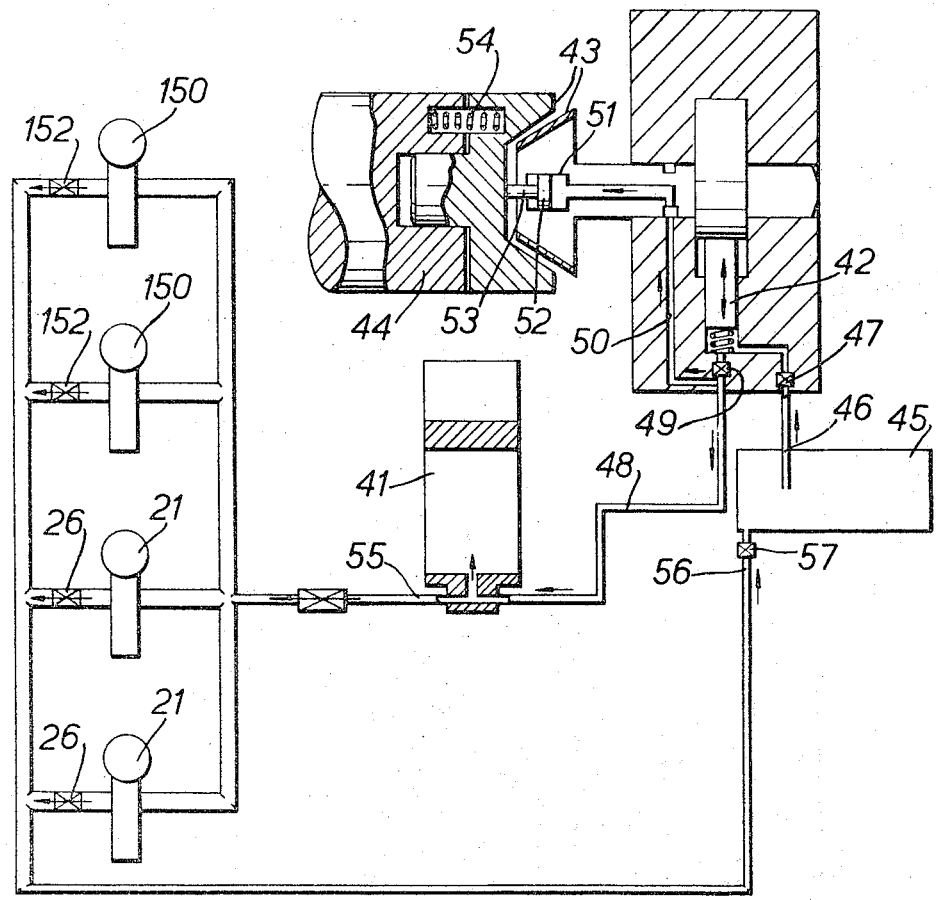
Figure 4:
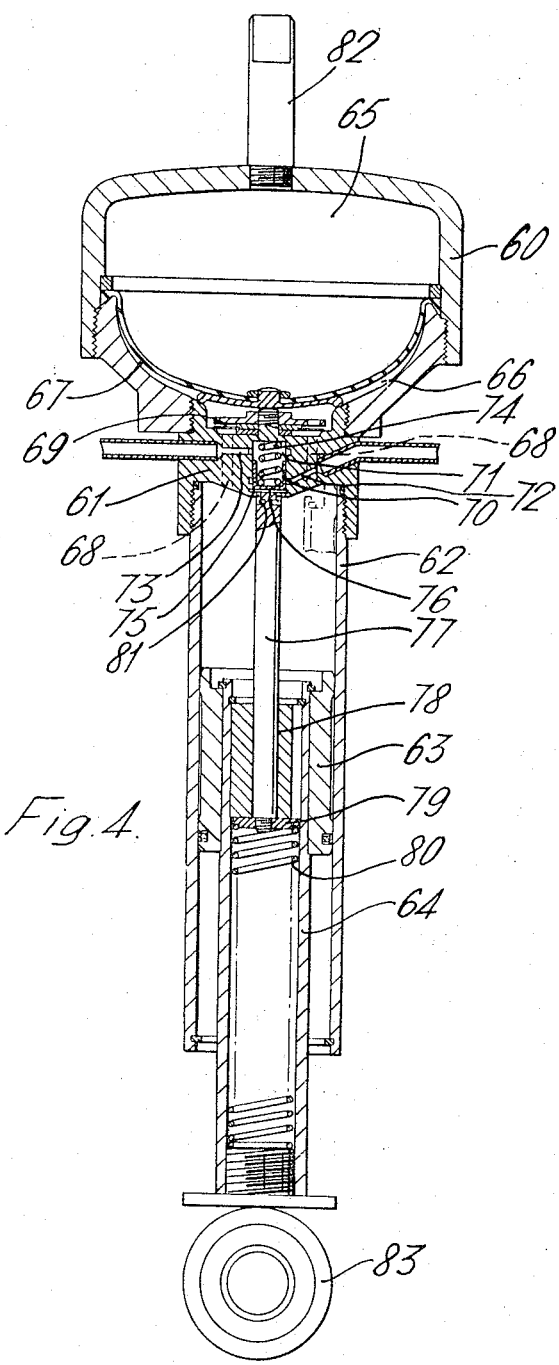

Some vehicle suspension systems in accordance with our invention, two forms of suspension strut, and a valve for incorporation in the systems are illustrated in the accompanying drawings in which:

FIGURE 1 is a layout of one suspension system;
FIGURE 2 is a layout of another suspension system;
FIGURE 3 is a layout of modification of the suspension system shown in FIGURE 2;
FIGURE 4 is a vertical section through a suspension unit in one form;
FIGURE 5 is a vertical section on an enlarged scale of the control valve means of FIGURE 4;
FIGURE 6 is a vertical section through a suspension strut in another form;
FIGURE 7 is a vertical section on an enlarged scale of the valve means of FIGURE 6;
FIGURE 8 is a section of a pressure chamber for use with the suspension strut illustrated in FIGURE 6; and
FIGURE 9 is a section through a control valve for incorporation in either of the suspension systems illustrated in FIGURES 2 or 3.

In the layout shown in FIGURE 1, 10 is a pump providing hydraulic fluid under pressure for the system and may be driven by the engine of the vehicle or any other convenient means such as a source of vacuum or an electric motor. The pump is fed with hydraulic fluid from a reservoir 11 and circulates hydraulic fluid through a control valve 12 and pipe-lines 13, 14 to two pairs of suspension struts 15, 16 of which the suspension struts 15 are associated individually with the front wheels of the vehicle and the struts 16 are associated individually with the rear wheels of the vehicle.

Hydraulic fluid from the struts 15 is returned to the reservoir through a pipe-line 17 and a relief valve 18, fluid from the struts 16 being returned to the reservoir through an exhaust pipe-line 19 and a relief valve 20.

In the suspension system shown in FIGURE 2, hydraulic fluid under pressure is supplied to front suspension struts 21 from an hydraulic accumulator 22 through pipe lines 23 and 27, hydraulic fluid from the struts 21 being returned to a reservoir 24 through an exhaust pipe-line 25 and a pressure relief valve 26 for each unit. Between the accumulator 22 and pipe-lines 23 and 27 is connected a pipe-line 28 which supplies hydraulic fluid under pressure to suspension struts 150 for the rear wheels, hydraulic fluid from the rear wheel suspension struts being returned to the reservoir 24 through exhaust pipe-lines 151 and relief valves 152. The hydraulic accumulator is fed with hydraulic fluid under pressure by a pump 29 driven by a part of the vehicles transmission such as its cam shaft or the drive for the generator. In the arrangement illustrated the pump is of the reciprocating type and draws fluid from the reservoir through a pipe-line 30 and non-return valve 31 and pumps it to the accumulator through a pipe-line 32 and a non-return valve 33. In the pipe-line 32 between the non-return valve 33 and the accumulator 22 there is connected a pipe-line 34 which leads into a cylinder 35 in which works a piston 36, the cylinder at its lower end communicating with the reservoir through a pipe-line 37. The piston 36 is urged in an upward direction by a spring 38 so that the wall of the piston normally closes an orifice 39 in the wall of the cylinder which communicates through a pipe-line 40 with the pipe-line 30 downstream of the non-return valve 31.

When the pressure of the hydraulic accumulator attains a predetermined maximum value the pressure in the pipe-line 34 moves the piston 36 in a downward direction against the force of the spring 38 and the pipe-line 34 is placed in communication with the pipe 40 thus forming a by-pass for the pump.

Alternatively the drive to the pump may be disconnected when maximum accumulator pressure is reached. As shown in FIGURE 3 an hydraulic accumulator 41 is fed with hydraulic fluid under pressure by a pump 42 of the reciprocating type driven by a clutch 43 from a part of the vehicles transmission such as the generator drive or cam shaft 44. The pump draws fluid from a reservoir 45 through a pipe-line 46 and a non-return valve 47 and pumps it to the accumulator through a pipe-line 48 and a non-return valve 49. In the pipe-line 48 downstream of the non-return valve 49 there is a connection 50 which supplies fluid under pressure to a cylinder 51 in one half of the clutch in which works a piston 52 having a piston rod 53 for engagement with the other half of the clutch rotatable with the generator drive or cam shaft 44.

The two halves of the clutch are held in engagement for driving the pump by springs 54 but when maximum accumulator pressure is reached the pressure in the connection 50 moves the piston 52 to the left in the drawing moving with it against the force in the springs 54 the half of the clutch with which its piston rod 53 engages, thus disconnecting the drive to the pump. When the accumulator pressure drops below its maximum value the pressure in the connection 50 decreases and the two halves of the clutch automatically engage.

Hydraulic fluid from the accumulator is supplied to the suspension struts associated with the wheels of the vehicle through a pipe-line 55 and hydraulic fluid is returned to the reservoir through a pipe-line 56, and non-return valve 57. This arrangement is identical to that described above with reference to FIGURE 2 and need not be further described.

In a modification of the systems described above with reference to FIGURES 2 and 3 the pump 29, 42 may be of the rotary type.

As alternatives to both of these arrangements the pump may be vacuum driven or it may be driven by an electric motor which is energised by a relay; in response to a pressure operated switch sensitive to accumulator pressure.

In either of the systems described above with reference to FIGURES 2 and 3 in which the installation includes as accumulator we may provide, in the pipe-line 23, 55 from the accumulator 22, 41, to the struts, a valve which closes when the delivery from the pump 29, 42 ceases or the pressure of the delivery falls below a predetermined value.

This prevents leakage of fluid from the accumulator to the struts when the vehicle is stationary.

One convenient construction of such a valve 140 is shown in FIG. 9. In this arrangement the housing having an inlet passage 141 for connection to a pipe-line leading from the accumulator, and an outlet passage 142 for connection to a pipe-line leading to the suspension struts. A coned valve seating 143 provides communication between the inlet passage and the outlet passage, and a coned valve member 144 is urged by a spring 145 into engagement with the seating. When the pump is functioning normally the coned valve member is held off its seating by a plunger 146 carried by a piston 147 working in a cylinder 148 in the valve housing and exposed on the side remote from the coned valve member to the pump pressure.

When the pump is stopped or if the pressure fails for any reason the piston is moved in the opposite direction by a spring 149 which permits the valve member to be moved into engagement with its seating to cut off communication between the accumulator and the units. A bleed outlet (not shown) is provided on the pump side of the piston to release fluid trapped between the piston and the pump so that there is no risk of the valve being held open.

The suspension struts incorporated in any of the systems described above are substantially identical in construction and operation. One form of strut is illustrated in FIGURES 4 and 5 of the drawings. In this arrangement a pressure chamber 60, attached to the upper end of a cylinder 62 in which works a piston 63 mounted on a hollow piston rod 64, is divided into two spaces 65 and 66 by a diaphragm 67. The space 65 above the diaphragm is filled with air or gas under pressure and the space 66 below the diaphragm is filled with hydraulic fluid. The cylinder at its lower end is open to atmosphere. Alternatively at this end the cylinder may be sealed against the ingress of dirt or foreign matter by a rolling diaphragm or flexible boot of rubber or similar material such that relative movement between the piston and its associated piston rod is accompanied by movement of the rolling diaphragm or boot and the volume below the piston within the cylinder is maintained substantially constant.

Through the closure 61 for the upper end of the cylinder is formed a series of angularly spaced axial passages 68 controlled by a plate valve 69 operating to allow liquid to pass in both directions between the space 66 in the pressure chamber and the interior of the cylinder 62 above the piston to provide damping.

A valve spool 70 working in a blind axial bore 71 in the closure controls inlet and outlet passages 72 and 73 connecting respectively to the pipe-line from the pump or accumulator and the exhaust pipe-line which returns fluid to the reservoir. The inlet passage 72 is located below the outlet passage in an axial direction and the valve spool is normally urged by a spring 74 against a circlip 75 in the open end of the bore 71, in which position it closes the inlet passage 72. An orifice 76 in the lower end of the valve spool is normally closed by the engagement of a seal 81 on the upper end of an axially movable control rod 77 which works in an axial bore 78 in the piston. At its lower end the control rod carries a disc 79 slidably guided in the bore in the piston rod which is closed at its lower end. A compression spring 80 located in the piston rod engages between the disc and the lower end of the bore and urges the axial rod 77 upwardly to hold its upper end in engagement with the valve spool. The rod is of smaller diameter than the bore 71 in which works the valve spool 70 so that an annular clearance provided between the rod and the bore allows fluid communication between the inlet passage 72 and the space in the cylinder above the piston 63.

The struts are adapted to be connected between sprung and unsprung parts of the vehicle respectively by a boss 82 welded or otherwise secured to the upper end of the pressure chamber and an eye 83 on the lower end of the piston rod 64.

Normally, the effective length of each strut is maintained at a substantially constant value irrespective of the weight and loading of the vehicle. The strut assumes the position shown in FIGURE 4 in which the body of the vehicle is maintained at a predetermined level and in which the pressure of the air or gas in the space 65 above the diaphragm is sufficient to support the weight and loading of the vehicle.

When the vehicle is in motion and its loading and weight are constant, inequalities in the surface over which the vehicle is travelling cause relative movement between the sprung and unsprung parts of the vehicle which are accompanied by relative axial movement between the cylinder and the piston. Upon axial compression of the strut, as the spring 80 is stronger than the spring 74 urging the valve spool against the circlip 75, the valve spool is moved upwardly to uncover the inlet passage 72 and permit hydraulic fluid under pressure from the pump to enter the cylinder above the piston. Upon axial extension of the strut the control rod 77 at its upper end is moved away from the valve spool so that when the unit is again compressed axially fluid is forced through the orifice 76 in the valve spool and is returned to the reservoir through the outlet passage 73. This continues until the upper end of the control rod closes the orifice 76.

If the loading on the vehicle is increased, the strut is compressed and more fluid under pressure from the pump enters the cylinder and is forced into the space 66 in the pressure chamber 60 below the diaphragm, so that the pressure of the air or other gas in the space 65 above the diagram is increased to an extent sufficient to support the increased load. Fluid under pressure supplied to the cylinder then acts on the piston to extend the strut until a position is reached in which the control rod 77 at its upper end is moved away from the valve spool so that as described, above, fluid from the cylinder is returned to the reservoir. In this position the effective length of the strut is again maintained at its predetermined value in which the body of the vehicle is maintained at its predetermined level.

Any further extension in the length of the strut, as by reduction in the loading on the vehicle, causes the control rod 77 to be retracted automatically from its engagement with the valve spool to permit fluid to flow from the high pressure space in the cylinder above the piston and to the exhaust passage 73 through the orifice 76.

Relative axial movements between the cylinder and the piston are damped by the valve 69 above the piston and through which liquid has to flow in passing between the cylinder and the pressure chamber, so that a smooth action of the strut is obtained even on a rough surface.

In any of the suspension systems described above, the fluid in the exhaust passage 73 is returned to the reservoir through the exhaust pipe-line in which the relief valve is positioned. The relief valve is arranged to permit fluid from the exhaust passage to be returned to the reservoir only when the pressure of the fluid exhausted from the strut exceeds a predetermined value. This ensures that a minimum pressure is maintained in each strut even though the wheel or axle with which the strut is associated is not taking its full share of the weight and loading of the vehicle.

In another arrangement the relief valve may be located in the exhaust passage 73 itself.

The strut or each strut of either embodiment operates automatically as described above so that its effective length can be maintained substantially constant changes take place in the volume of the hydraulic fluid in the space in the cylinder above the piston and in the space in the pressure chamber below the piston or diaphragm, and/or in the volume of the gas in the space in the pressure chamber above the piston or diaphragm which may change due to changes in temperature.

Although we have described a suspension strut in which the pressure chamber is secured to a closure 61 for the upper end of the cylinder 62, in an alternative construction the pressure chamber can be separate from the strut. As illustrated in FIGURE 8 a pressure chamber for the modified strut shown in FIGURES 6 and 7 comprises a cylinder 90 in which works a floating piston 91 and which at its upper end is closed by a member 92 to which is welded or otherwise secured a boss 95. The boss has a screw-threaded axial bore 96 into which is screwed a union 97 of which the outer end is formed to receive a connection for introducing air or other gas under pressure into a chamber 98 above the piston through a port 99 in the closure member 92. At its lower end the cylinder is closed by a plug 100 held in position by a circlip 101, and an annular seal 102 for the plug is located in an annular recess in the plug.

The strut illustrated in FIGURES 6 and 7 is similar in construction to the strut illustrated in FIGURES 4 and 5 and only its upper portion is shown. In this arrangement 105 is a cylinder in which works a piston 106 mounted on the upper end of a hollow piston rod 107. On the upper end of the cylinder is mounted a cup-shaped cap 108 and between an annular shoulder 109 in the cap and an annular collar 110 between the cap and the end of the cylinder is located a closure 111 for the upper end of the cylinder. Through the closure 111 is formed a series of angularly spaced axial passages 112 controlled by a plate valve 113 operating to allow liquid to pass in both in both directions between a chamber 114 above the closure and the space in the cylinder above the piston to provide damping. The closure 111 has a central axial bore 115 in which is fixed a sleeve 116. A valve spool 117 working in the sleeve controls ports 118, 119 in the wall of the sleeve, which communicate respectively with radial passages 120, 121 in the closure leading to the pipe-line from the pump or accumulator and the exhaust pipe-line which returns fluid to the reservoir.

The port 118 in the sleeve is located below the port 119 in an axial direction and the valve spool is normally urged by a spring 112 against a collar 123 secured to the sleeve on its open end. The valve spool 117 is made of sufficient axial length to provide a range of positions in which both inlet and outlet ports are closed, this range covering the normal variations in the axial position of the valve caused by short term oscillations when the vehicle is in motion on the road. An axially movable control rod 126 which works in an axial bore 127 in the piston normally abuts against the lower end of a valve spool by way of a pad 125 mounted on the upper end of the rod. At its lower end the control rod carries a disc 128 slidably guided in the bore in the piston rod the disc is normally held in engagement with the piston by a compression spring 129 located in the piston rod and which urges the control rod upwardly to hold the seal on its upper end in engagement with the valve spool. The rod is of smaller diameter than the bore of the sleeve in which works the valve spool so that an annular clearance provided between the rod and the bore allows fluid communication between the inlet passages 118 and 120 and the space in the cylinder above the piston.

The chamber 114 in the cap 108 is connected to a space 131 below the piston in the pressure chamber through a pipe-line of which one end is connected to an outlet connection 130 in the wall of the cap 108 and one of the inlet connections 132 in the plug 100 closing the lower end of the cylinder of the pressure chamber.

Each suspension strut may be connected to a separate pressure chamber but in the arrangement shown suspension struts for the rear wheels are connected to the same pressure chamber.

The struts are adapted to be connected between sprung and unsprung parts of the vehicle respectively in a similar manner to the struts described above with reference to FIGURE 4. Similarly the effective length of each strut is maintained at a substantially constant value irrespective of the weight and loading of the vehicle. Normally the chamber 98 in the pressure chamber is filled with air or other gas under pressure and the strut assumes the position shown in FIGURE 6 of the drawings in which the body of the vehicle is maintained at a predetermined level and in which the pressure of air or gas in the space 98 in the pressure chamber above the diaphragm is sufficient to support the weight and loading of the vehicle.

When the vehicle is in motion and its loading and weight are constant, irregularities in the surface over which the vehicle is travelling cause relative movement between sprung and unsprung parts of the vehicle which are accompanied by relative axial movement between the cylinder and the piston. However as described above as the valve spool is made of sufficient axial length to provide a range of positions covering these normal short term oscillations when relative movement between the cylinder and the piston take place under these conditions both the inlet and outlet ports 118, 119 are closed.

This avoids wastage of hydraulic fluid caused by successive openings of the respective ports when the vehicle is travelling over a rough surface.

To avoid the formation of an hydraulic lock by fluid trapped above the valve spool 117 when it closes the inlet and outlet ports 118, 119 an axial drilling 133 may be provided in the upper end of the control rod 126 in alignment with a passage 124 in the bottom end of the valve spool, this drilling communicating with the cylinder through a radial port 134 in the rod.

The operation of the strut or each strut is otherwise the same as the arrangement described above with the reference to FIGURE 4 and need not be further described herein.

The increase in the effective length of either of the forms of struts described above which could be produced when the vehicle is stationary by leakage of fluid from the inlet passage or port 72, 118 past the valve spool into the pressure chamber is avoided by making the differential pressure between the inlet passage or port and the exhaust passage or port 73, 119 greater than between the inlet passage or port and the pressure chamber.

In any of the suspension systems described above restrictions may be provided in the inlet and exhaust conduits to the struts to control the flow of fluid to and from the strut in order to avoid having to change the pump and/or strut size for different installations.

These restrictions can also be used to control the rate of extension and contraction of a unit when the vehicle is stationary and the loading changes as for example when passengers leave and enter the vehicle.

In a modification of both forms of suspension strut described above with reference to FIGURES 4 and 5, and FIGURES 6 and 7 a guide of substantial length for the hollow piston rod is provided at the end of the cylinder remote from the pressure chamber, means being provided for the passage or air through the guide so that the annular space around the piston rod below the piston is maintained at atmospheric pressure.

We claim:

1. An hydro-pneumatic suspension assembly for connection between an axle and a frame of a vehicle comprising a cylinder having an end closure, a piston reciprocable in said cylinder and forming with the cylinder and with said end closure a working chamber, a pressure chamber to receive gas under pressure, means defining a passage intercommunicating said working chamber and said pressure chamber, a valve operating member, means permitting reciprocating movement of said piston relative to said valve operating member, means yieldably holding said valve operating member relative to said piston, means in said end closure forming an inlet to and an outlet from said working chamber, a valve controlling said inlet and outlet and engageable by said valve operating member, said valve including a passage interconnecting said working chamber and said outlet and being closable by said valve operating member on engagement with said valve, resilient means biassing said valve to a first position in which said inlet is closed and said outlet is open, and said resilient means yielding on engagement of said valve by said valve operating member on entry of said piston into said working chamber to allow said valve to move into a second position in which said outlet is closed and said inlet is open, said means yieldably holding said valve operating member yielding as said valve approaches said second position and when said piston moves relatively to said valve operating member.

2. An hydro-pneumatic suspension assembly for connection between an axle and a frame of a vehicle comprising a cylinder having an end closure, a piston reciprocable in said cylinder and forming with the cylinder and with said end closure a working chamber, a pressure chamber to receive gas under pressure, means defining a passage intercommunicating said working chamber and said pressure chamber, a valve operating member, means permitting reciprocating movement of said piston relative to said valve operating member, means yieldably holding said valve operating member relative to said piston, means in said end closure forming an inlet to and an outlet from said working chamber, a valve controlling said inlet and outlet and engageable by said valve operating member, said valve being of a length sufficient to close both said inlet and outlet simultaneously and having a first passage providing communication between said working chamber and said outlet, and said valve operating member having a second passage adapted to co-operate with said first passage in said valve on engagement of said valve operating member with said valve to provide communication between said working chamber and a side of the valve remote from said valve operating member, resilient means biassing said valve to a first position in which said inlet is closed and said outlet is open, and said resilient means yielding on engagement of said valve by said valve operating member on entry of said piston into said working chamber to allow said valve to move into a second position in which said outlet is closed and said inlet is open, said means yieldably holding said valve operating member yielding as said valve approaches said second position and when said piston moves relatively to said valve operating member.

References Cited by the Examiner

UNITED STATES PATENTS

| | | | |
|---|---|---|---|
| 2,644,699 | 6/1953 | Weiertz | 280—124 |
| 2,902,288 | 9/1959 | Dill | 267—64 X |
| 2,907,578 | 10/1959 | Taber. | |
| 2,915,307 | 12/1959 | Heiss. | |
| 2,923,557 | 2/1960 | Schilling. | |
| 2,957,702 | 10/1960 | Heiss. | |
| 2,965,373 | 12/1960 | Heiss | 267—64 |
| 2,976,032 | 3/1961 | Sampietro. | |
| 3,071,394 | 1/1963 | Miller. | |
| 3,074,709 | 1/1963 | Ballard. | |
| 3,088,726 | 5/1963 | Dangauthier | 267—64 |
| 3,123,349 | 3/1964 | Cislo. | |
| 3,127,189 | 3/1964 | Schultz. | |
| 3,141,659 | 7/1964 | Lyon | 267—64 X |
| 3,156,481 | 11/1964 | Dangauthier. | |
| 3,206,185 | 9/1965 | Oldberg | 267—64 |

BENJAMIN HERSH, *Primary Examiner.*

MILTON BUCHLER, *Examiner.*

W. A. MARCONTELL, M. S. SALES, P. GOODMAN,
*Assistant Examiners.*